Sept. 29, 1953 J. C. SHOTTON 2,653,384
DENTAL HANDPIECE
Filed June 21, 1952

INVENTOR.
JOHN C. SHOTTON
BY Hudson Boughton,
Williams, David & Hoffmann.
ATTORNEYS Patented Sept. 29, 1953

2,653,384

UNITED STATES PATENT OFFICE 2,653,384

DENTAL HANDPIECE

John C. Shotton, Lakewood, Ohio

Application June 21, 1952, Serial No. 294,830

1 Claim. (Cl. 32—26)

This invention relates to a dental tool and more particularly to that type of dental tool usually known as a hand piece.

In dental tools of the hand piece type as heretofore constructed difficulty has been experienced in that the use of the tool causes relatively rapid wear of the parts with a resultant looseness therebetween. The looseness between the parts of the tool due to the wear is greatest at the bearing surfaces of the relatively rotatable parts of the tool as, for instance, the bearing surfaces which rotatably mount the spindle of the hand piece. When this looseness of the parts of the hand piece occurs the tool loses its efficiency of operation and becomes subject to vibration, gyratory rotation, and other undesired characteristics. Heretofore when such looseness has reached a critical condition, it has been necessary usually to replace the hand piece with a new one. This tendency toward rapid wear of the parts in dental hand pieces as heretofore constructed has substantially lessened the useful life of the hand piece and has materially increased the dentist's costs by necessitating the discarding of the old tool and the purchase of a new one.

The rear end of the hand piece where the power is applied, particularly the rear bearing for the rotating spindle, is subject usually to the most rapid wear. When the rear bearing for the spindle becomes worn, the high speed rotation of the spindle causes it to whip and to not rotate concentrically. This results in rapidly damaging the front bearing for the spindle.

The collet chuck in the spindle which grips the bit of the dental tool mounted in the hand piece also deteriorates rapidly in use and because of this the dentist must return the hand piece to the manufacturer for reconditioning or must purchase a new hand piece.

The present invention contemplates a new and improved dental tool such as a hand piece which is so constructed that any wear occurring between the parts of the tool can be compensated for and the parts relatively adjusted to take up any undesired looseness therebetween. Consequently the dental tool embodying the present invention has the advantage over the tools now in use of longer useful life, increased efficiency and economic saving.

More particularly the invention contemplates providing in a dental hand piece bearing supports for the rotatable spindle, which can be readily and effectively adjusted relative to each other to compensate for any wear occurring between the relatively rotatable surfaces of the bearing supports.

Also the construction of the hand piece embodying the invention is such that the dentist himself can readily replace the spindle thereof with a new spindle. It is proposed in selling the hand piece to include with it an extra spindle unit containing a collet chuck so when the efficiency of the latter deteriorates the dentist can replace the old spindle unit with the new one without having to send the hand piece to the manufacturer. The construction is such that the replacement can be readily accomplished and the parts, such as the bearings, can be easily and simply adjusted.

Additional objects and advantages inherent in the invention will become apparent hereinafter during the detailed description of an embodiment of the invention which is to follow and which embodiment is illustrated in the accompanying drawing wherein.

Figure 1:
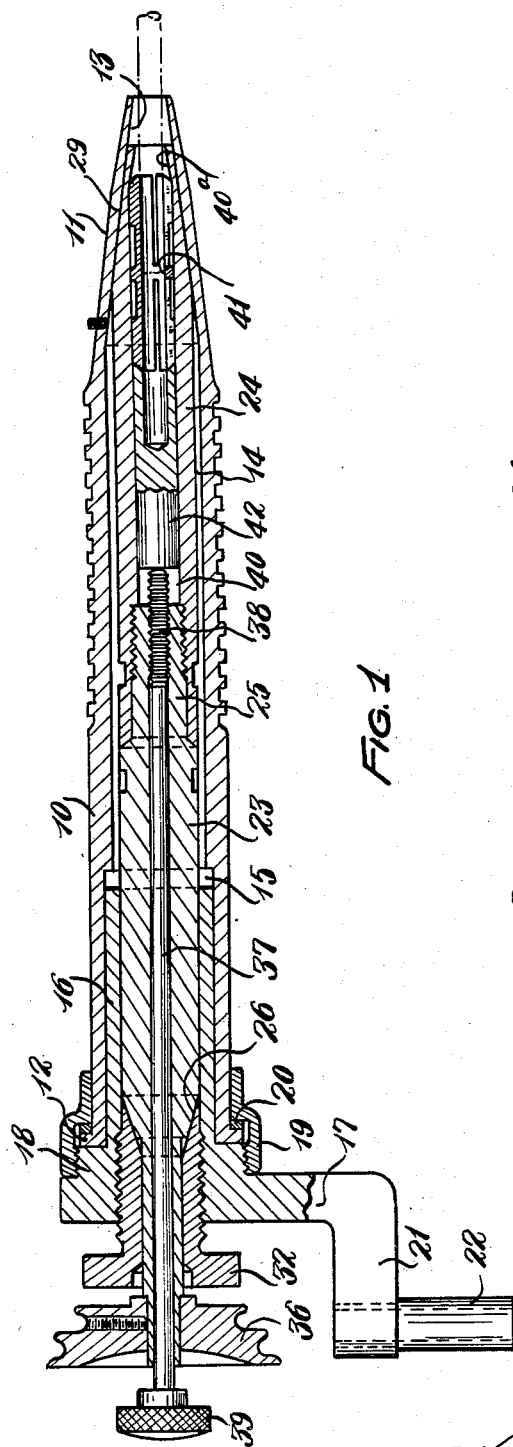
Fig. 1 is a longitudinal sectional view through a dental hand piece constructed in accordance with the present invention.

The hand piece shown in Fig. 1 comprises a hollow outer casing or sheath 10 which at one end is provided with a tapered or conical nose 11. The opposite end of the casing or sheath 10 from the nose 11 is formed with a radially extending annular flange 12. The nose 11 is provided with a conical or tapered bore 13 as is usual in tools of this character. The tapered bore 13 at its inner or larger end communicates with a cylindrical bore 14 in the casing or sheath 10. The cylindrical bore 14 in turn extends to and communicates with an enlarged counterbore 15 adjacent to the other or opposite end of the casing or sheath.

The counterbore 15 of the casing or sheath telescopically interfits the sleeve portion 16 formed integral with the leg 17 of the L-shaped bracket part of the usual wrist and slip joint employed for attaching and connecting dental hand pieces and similar tools to the so-called cord engines used by dentists for operating their equipment.

Integral with the long leg 17 of the bracket and intermediate the sleeve portion 16 and said leg is an externally threaded cylindrical enlarged portion 18 and upon which screws the usual connecting nut 19 carried by the casing or sheath 10 as will be well understood in the art.

It will be seen that when the nut 19 is screwed upon the portion 18 the casing or sheath 10 is drawn toward the portion 18 until the flange 12 tightly abuts said portion 18 as will be well understood in the art. A gasket 20 may be interposed between the nut 19 and the flange 12.

The short arm 21 of the L-shaped bracket is provided at its free end with the usual tubular connecting element 22 by means of which the bracket is connected to the remainder of the wrist and slip joint all as is conventional in the art.

The spindle unit of the hand piece is illustrated as including two interconnected spindle parts 23 and 24. The spindle part 23 at one end is provided with an externally threaded reduced diameter neck 25 that screws into a threaded counterbore formed in the inner or left hand end of the spindle part 24 as viewed in Fig. 1, whereby the two spindle parts are interconnected. The inner or left hand end of the spindle part 24 is tapered or conical to seat tightly against a complementary shoulder on the spindle part 23 and located at the junction of the neck 25 with said spindle part 23.

The spindle part 23 remote from the neck 25 is formed with a tapered or conical external bearing surface portion 26, which at its small end provides a short radial annular shoulder from which extends a reduced cylindrical portion 27 having adjacent its free end a still further reduced cylindrical portion 28 for a purpose later to be explained.

The free or right hand end of the spindle part 24 as viewed in the drawing is provided with a conical or tapered external surface portion 29. The tapered or conical external surface portion 29 of the spindle rotatably interfits the tapered bore 13 in the nose 11 of the casing or sheath 10 when the spindle is properly positioned in the casing and, in effect, constitutes a bearing surface portion for the right hand end of the spindle.

The external diameter of the spindle intermediate the tapered or conical bearing surface portions 26 and 29 is uniform and such as to provide a clearance between the spindle and the interior of the casing or sheath in the bore 14 and counterbore 15. However, the cylindrical intermediate portion of the spindle part 25 rotatably interfits the sleeve portion 16 that is integral with the long leg 17 of the L-shaped bracket of the wrist and slip joint. This provides for a relatively long cylindrical bearing support for the spindle intermediate its ends which in conjunction with the conical or tapered bearing support between the surface portion 29 and the nose 11 of the casing 10 rotatably mounts the spindle in the casing adequately, concentrically and with stability.

The long leg 17 of the L-shaped bracket, the externally threaded portion 18 thereof and the sleeve 16 are provided with a bore concentric to the interior of the sleeve 16 and threaded to enable the adjusting or compensating bearing nut 30 to be screwed into position. The bearing nut 30 comprises an externally threaded elongated sleeve or cylindrical portion 31. One end of the nut 30 is provided with a polygonal head 32 to which a wrench or other suitable tool can be applied when it is desired to adjust the nut. The free end of the sleeve 31 of the nut 30 has a cylindrical smooth external surface portion 33 which telescopically interfits the interior of the sleeve 16. The nut 30 is provided with a central bore 34 extending from the head 32 and terminating in a tapered or conical counterbore 35 that is complementary to the tapered or conical external bearing surface portion 26 of the spindle part 23.

The reduced cylindrical portion 27 of the spindle part 23 is rotatably supported in the bore 34 of the nut 30 while the tapered or conical external surface portion 26 of the spindle part 23 rotates in the conical or tapered counterbore 35 of the nut 30. It will be seen that when the nut 30 is tightened or screwed inwardly and the tapered or conical counterbore 35 thereof engages the tapered or conical bearing surface portion 26 of the spindle the nut will exert a force on the spindle acting to adjust or position the tapered or conical bearing surface portion 29 thereof in the tapered bore 13 of the nose 11 of the casing or sheath 10. Consequently the spindle can be correctly mounted in the casing so as to rotate concentrically therein without endwise play.

In case continued use of the tool produces wear between the bearing surfaces of the spindle and casing or sheath with a resulting looseness or play of the spindle in the casing all that need be done is to tighten the nut 30 to cause the tapered counterbore 35 thereof to adjustably position itself upon the tapered surface 26 of the spindle and to effect the proper cooperating bearing relationship between the conical surface 29 of the spindle and the tapered bore 13 of the nose 11.

It will be seen that the construction thus far described provides adequate bearing surfaces between the spindle and the casing or sheath and that any wear on such surfaces due to use of the tool can be adequately and quickly compensated for by adjusting the bearing nut 30. In this way the accuracy and efficiency of the tool can be maintained throughout the entire life of the tool and such life will be materially increased and the necessity of replacing the entire tool because of the looseness of the parts will be avoided.

A double groove two-speed pulley 36 is fixed on the reduced cylindrical end 28 of the spindle and as is well understood receives the driving cord which rotates the spindle. The driving power being applied to this end of the spindle and the tension exerted thereon by the driving cord subject the bearing surfaces at this end of the spindle to the greatest wear. However, the take-up provided between the conical bearing surfaces 26 and 35 and the extended cylindrical bearing surfaces between the spindle and sleeve 16 and nut sleeve 31 on the opposite sides of the conical bearing surfaces adequately resist and compensate for these wearing forces or tendencies.

The spindle part 23 and the neck 25 thereof are provided with a bore with the end of the bore within the neck 25 being threaded. This bore receives the chuck actuating rod 37 which has a threaded inner end 38 screwing into the threaded portion of the bore through the part 23 and projecting therebeyond into a bore in the spindle part 24 later to be referred to. The chuck actuating rod 37 extends beyond the drive pulley 36 and mounts on its end a knurled actuating knob 39 as is well understood in the art.

The spindle part 24 is provided with a bore 40 which extends from the inner end of the spindle part toward its outer or right hand end as viewed in the drawing where it communicates with a tapered bore portion 40a. The usual collet form of chuck 41 is mounted in the bore 40 while a cylindrical chuck actuating member 42 is located in the bore 40 intermediate the threaded end of the actuating rod 37 and the inner end of the chuck 41. It will be understood that the bit or shank of a dental tool can be inserted between the jaws of the collet chuck 41 and then when the actuating rod 37 is screwed inwardly of the hand piece the actuating member 42 is moved in a direction to move the chuck to cause the tapered portion 40a of the bore in the spindle part 24 to cam or clamp the chuck jaws closed upon the bit or shank. The arrangement just referred to is well understood in the art and need not be explained in greater detail.

Figure 2:
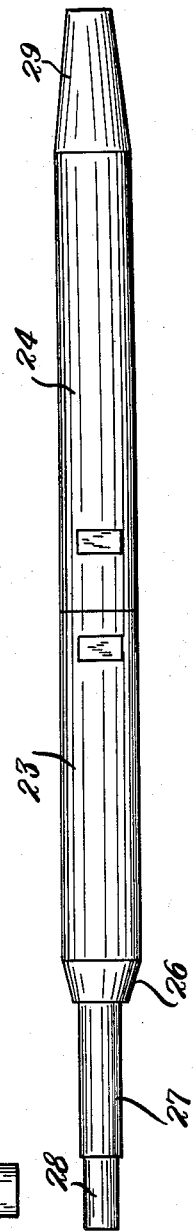
Fig. 2 is a detached elevational view of the spindle unit of the hand piece shown in Fig. 1.
Figure 3:
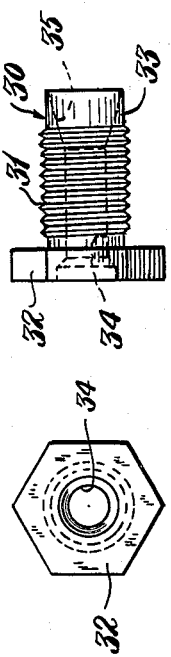
Fig. 3 is a detached elevational view of the adjustable compensating bearing nut part employed in the construction.
Figure 4:
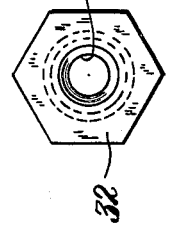
Fig. 4 is an end view taken looking from the left hand side of Fig. 3.

The spindle unit comprises the parts 23 and 24 and the member 42 and collet chuck 41. Such a unit is shown in Fig. 2 and it is contemplated providing each tool with an extra spindle unit which the dentist can mount in the tool when the chuck of the old spindle unit loses its efficiency.

The description of the embodiment of the invention heretofore set forth clearly shows that a dental hand piece constructed in accordance with the invention enables the parts of the hand piece to be maintained in proper assembled relationship, and particularly provides for the take-up of looseness or play between the spindle and its bearing supports, thus improving the efficiency, extending the life and reducing the maintenance costs of the dental hand piece. Also the construction is such that the tool may be readily assembled and disassembled by the dentist in replacing the spindle unit.

Although a preferred embodiment of the invention has been illustrated and described herein it will be understood that the invention is susceptible of various modifications and adaptations within the scope of the appended claim.

Having thus described my invention, I claim:

A dental hand piece comprising an elongated casing having at one end a conical nose and provided at its other end with an external flange, said casing having a conical bore in its nose communicating at its large end with a cylindrical bore extending toward the other end of the casing and communicating with a counterbore in said other end of the casing, a sleeve interfitting said counterbore and provided with an externally enlarged portion engaging against the external flange of the casing, means for detachably maintaining said casing and sleeve assembled, said sleeve having a portion of its interior threaded, an exteriorly threaded tubular adjusting nut screwed into said sleeve and provided with a cylindrical bore extending from its outer end and communicating with a conical bore portion at its inner end; and a chuck carrying spindle unit mounted in said casing and having a conical end rotatably interfitting the conical bore in the nose of the casing, a cylindrical portion rotatably interfitting said sleeve, a conical portion rotatably interfitting the conical bore portion of said adjusting nut, and a reduced cylindrical portion rotatably interfitting the cylindrical bore of said nut.

JOHN C. SHOTTON.

References Cited in the file of this patent

UNITED STATES PATENTS

| Number | Name | Date |
|---|---|---|
| 222,181 | Donaldson | Dec. 2, 1879 |
| 1,535,187 | Terry | Apr. 28, 1925 |